United States Patent [19]
Trask et al.

[11] Patent Number: 5,252,995
[45] Date of Patent: Oct. 12, 1993

[54] COLOR BOUNDARY ENHANCEMENT IN A MULTI-COLOR ELECTROSTATIC PRINTER

[75] Inventors: Jeffrey L. Trask; Gary L. Vondran, Jr., both of Boise, Id.

[73] Assignee: Hewlett-Packard Company, Palo Alto, Calif.

[21] Appl. No.: 939,814

[22] Filed: Sep. 3, 1992

[51] Int. Cl.$^5$ ............................................ G01D 15/06
[52] U.S. Cl. ..................... 346/157; 346/1.1; 346/108; 358/500; 358/518; 358/300
[58] Field of Search ........................... 358/75, 300, 80; 346/108, 157, 1.1

[56] References Cited

U.S. PATENT DOCUMENTS 4,894,665  1/1990  Davis ................................. 346/1.1
4,949,184  8/1990  Suzuki ................................ 358/300

Primary Examiner—Benjamin R. Fuller
Assistant Examiner—Randy W. Gibson

[57] ABSTRACT

A multi-color, electrostatic, laser printing system employs a method for enhancing color representations at boundaries of pixels with different colors. The system employs a charged electrostatic surface that is selectively discharged by application of a modulated laser beam. The system performs the steps of: identifying a pixel of a first color that bounds a pixel of a second color, the first color being a secondary color; decreasing applied laser power to the electrostatic surface at the secondary color pixel site in the process of applying underprint and overprint toners to produce the secondary color; and inhibiting the decrease of applied laser power when applying the overprint toner if the second color pixel is a primary color that is the same as the color of the overprint toner of the secondary color pixel. A similar inhibition action occurs when an isolated primary color pixel or a thin pixel line is found so as to assure proper development.

6 Claims, 4 Drawing Sheets

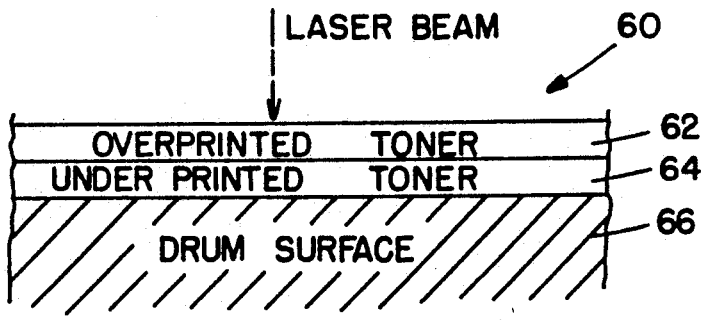
FIG. 4.
PRIOR ART
FIG. 5.
PRIOR ART
"EDGE A"
FIG. 6.
EDGE A EXAMPLES
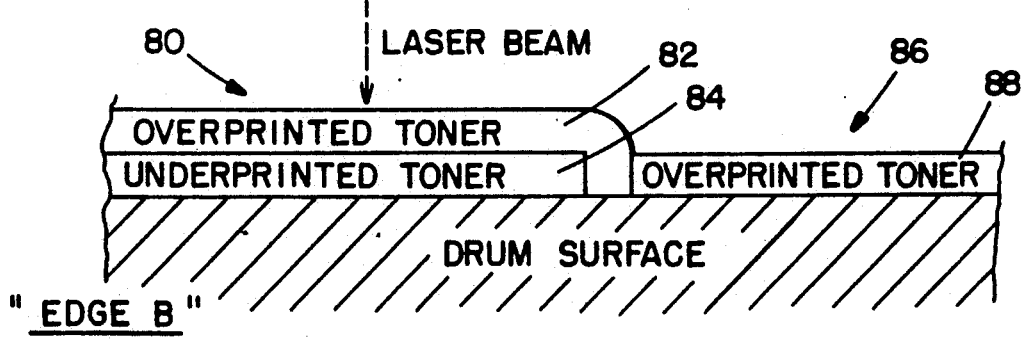
FIG. 7.
"EDGE B"

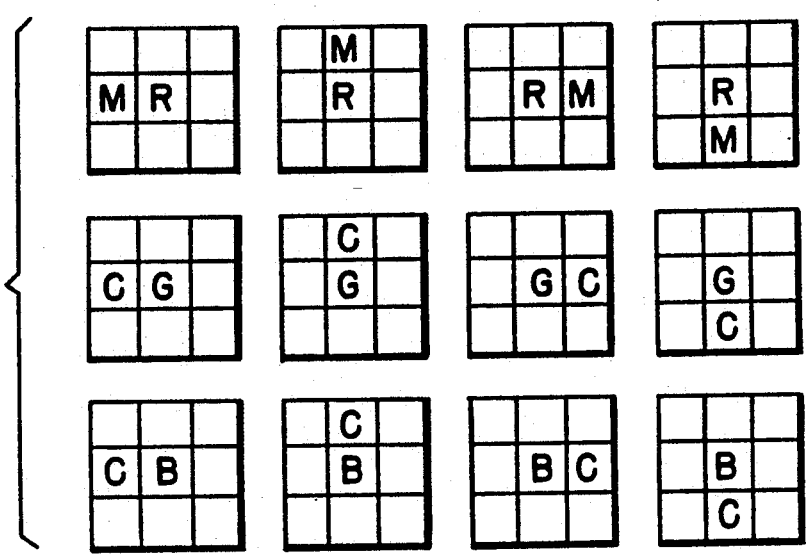
FIG. 8. EDGE B CASES
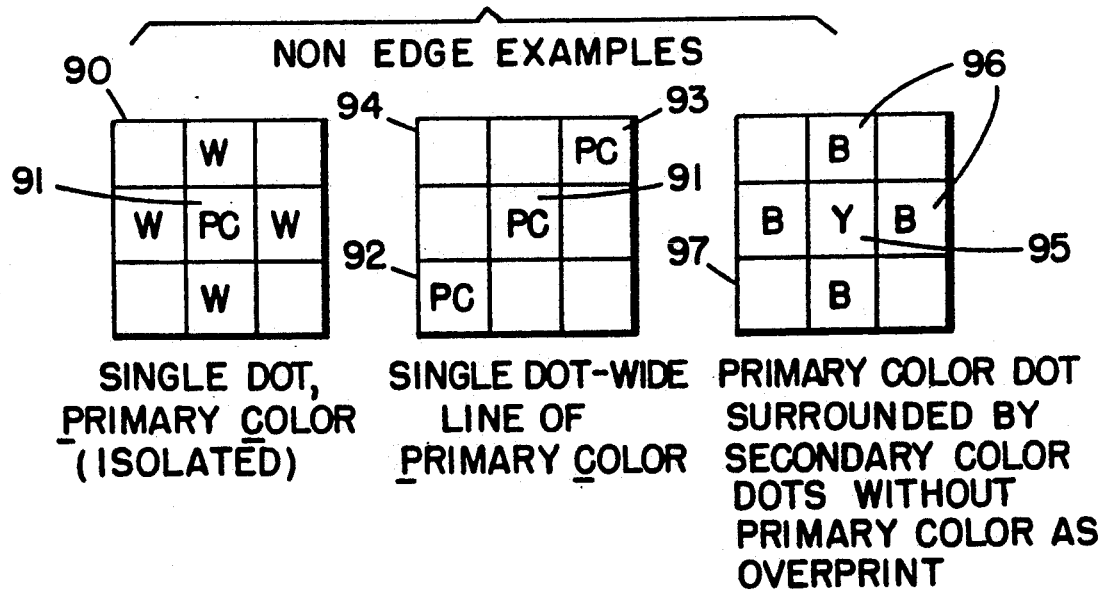
FIG. 9. NON EDGE EXAMPLES
SINGLE DOT, PRIMARY COLOR (ISOLATED)
SINGLE DOT-WIDE LINE OF PRIMARY COLOR
PRIMARY COLOR DOT SURROUNDED BY SECONDARY COLOR DOTS WITHOUT PRIMARY COLOR AS OVERPRINT

COLOR BOUNDARY ENHANCEMENT IN A MULTI-COLOR ELECTROSTATIC PRINTER

FIELD OF THE INVENTION

This invention relates to multicolor electrostatic printers, and more particularly, to a method and system for improving color print quality of edges, thin lines and dots in such printers.

BACKGROUND OF THE INVENTION

Multi-color electrostatic printers often employ a five pass process during which plurality of toners are placed on a photoconductive drum and then transferred to a paper carrier. During the first four passes, yellow, magenta, cyan, and black toners are applied, and on the fifth pass, the combined toners are transferred from the drum to a paper carrier.

In laser-based electrostatic printers, an electrostatic drum is first charged to a negative potential, after which the laser scans across the drum and discharges its surface where toner is to be placed. A developing roller coated with toner is generally charged to a negative potential that is intermediate between the original negative potential on the drum's surface and a totally discharged drum surface. Thus, the toner is attracted to the discharged areas of the drum surface and is repelled by the areas that are still negatively charged. Once a first toner is transferred to the drum surface, the drum is again charged and a new cycle of laser beam discharge occurs so that the next toner can be applied. Once all four toners are on the drum, transfer to paper occurs, as aforesaid.

As is known to those skilled in the art, primary colors are yellow, magenta, and cyan and secondary colors can be produced by a combination of the primary colors. The color red is produced by overlaying a magenta toner onto a yellow toner; green by overlaying a cyan toner onto a yellow toner; and blue by overlaying a layer of cyan onto a magenta toner. In general, when producing a secondary color, the "underprinted" toner will be yellow when printing magenta, yellow or magenta when printing cyan, and yellow, magenta, or cyan when printing black. While "process" black can be employed by combining the yellow, magenta, and cyan colors, it is often found more convenient to use a separate black toner to improve print quality.

With secondary colors, an underprinted toner previously placed on the electrostatic drum will reduce the power of the laser beam that strikes the drum surface. This results in a reduced level of discharge on the drum surface and a residual small negative potential. The residual negative potential repels some of an overprinted toner and causes a less dense layer thereof to be deposited on the drum surface. Thus, reds and greens appear somewhat yellowish and a blue color will be somewhat magenta-ish.

The Konica Corporation, in a system that is nonpublic at the date of filing hereof, but which is prior art hereto, has suggested that the laser beam, in preparation for deposit of an underprinted toner, be modulated so that the duration of exposure of the drum surface is less than the duration of exposure during an overprint application. That modulation enables the amount of underprinted and overprinted toners to be matched. More specifically, by providing a shorter period of exposure only during deposit of the underprinted toner, a somewhat smaller and less dense underprinted toner pixel is laid down and a somewhat larger and more dense overprinted toner pixel is superimposed thereover. This technique works well for producing a desired secondary color within a solid color-fill area, however, a property exists at the edges of the solid fill area that creates additional problems.

Due to properties of the electrostatic printing process, an underprinted toner of a secondary color tends to be drawn away from an edge and towards a solid fill area, more than an overprinted toner. This phenomenon appears as a "halo" of overprinted toner around a solid-color fill area.

The Konica system referred to above further employs an edge enhancement technique. When edge pixels are recognized and, when they are produced in a secondary color (comprising two overlaid primary color toners), the underprinted toner exposure is increased in relation to the exposure level for non-edge underprinted toner to prevent the occurrence of a halo effect. When edge pixels are recognized in a primary color, the toner exposure is decreased in relation to the exposure level for non-edge primary toner to control the width of primary color lines. The application of such an edge recognition procedure and a resultant reduction in applied laser power, itself, creates additional problems. For instance, when very thin single pixel-wide lines or isolated pixels are identified as "edge" pixels, a reduction in laser power can result in insufficient discharge of the drum surface and a concomitant loss of the pixel image altogether. Furthermore, where a secondary color pixel abuts a primary color pixel, a reduction in the exposure may create an undesired color perturbation at the interface.

Accordingly, it is an object of this invention to provide an improved method and system for rendering of color boundaries in a multi-color electrostatic laser.

It is another object of this invention to provide an improved method for rendering secondary color pixels that are immediately adjacent primary color pixels.

It is still a further object of this invention to provide an improved method and system for rendering of isolated pixels and thin pixel lines in a printer system wherein edge compensation is employed.

SUMMARY OF THE INVENTION

A multi-color, electrostatic, laser printing system employs a method for enhancing color representations at boundaries of pixels with different colors. The system employs a charged electrostatic surface that is selectively discharged by application of a modulated laser beam. The system performs the steps of: identifying a pixel of a first color that bounds a pixel of a second color, the first color being a secondary color; decreasing applied laser power to the electrostatic surface at the secondary color pixel site in the process of applying underprint and overprint toners to produce the secondary color; and inhibiting the decrease of applied laser power when applying the overprint toner if the second color pixel is a primary color that is the same as the color of the overprint toner of the secondary color pixel. A similar inhibition action occurs when an isolated primary color pixel or a thin pixel line is found so as to assure proper development.

DESCRIPTION OF THE DRAWINGS

FIG. 4 is a section view of a drum surface that is useful in understanding a prior art procedure for producing secondary color pixels.

FIG. 5 is a section view of a drum surface with a secondary color pixel and a neighboring pixel of a different color (white in this, case), termed an Edge A configuration.

FIG. 6 shows various Edge A pixel examples.

FIG. 7 is a section of a drum surface showing a pair of adjacent pixels, one pixel being a secondary color pixel and having an overprinted primary color toner that is the same as an adjacent primary color pixel (termed an "Edge B").

FIG. 8 illustrates various Edge B cases.

FIG. 9 illustrates a number of pixel arrangements that are classified as non-edges, even though they fulfill the definitions of Edge A pixels.

DETAILED DESCRIPTION OF THE INVENTION

Figure 1:
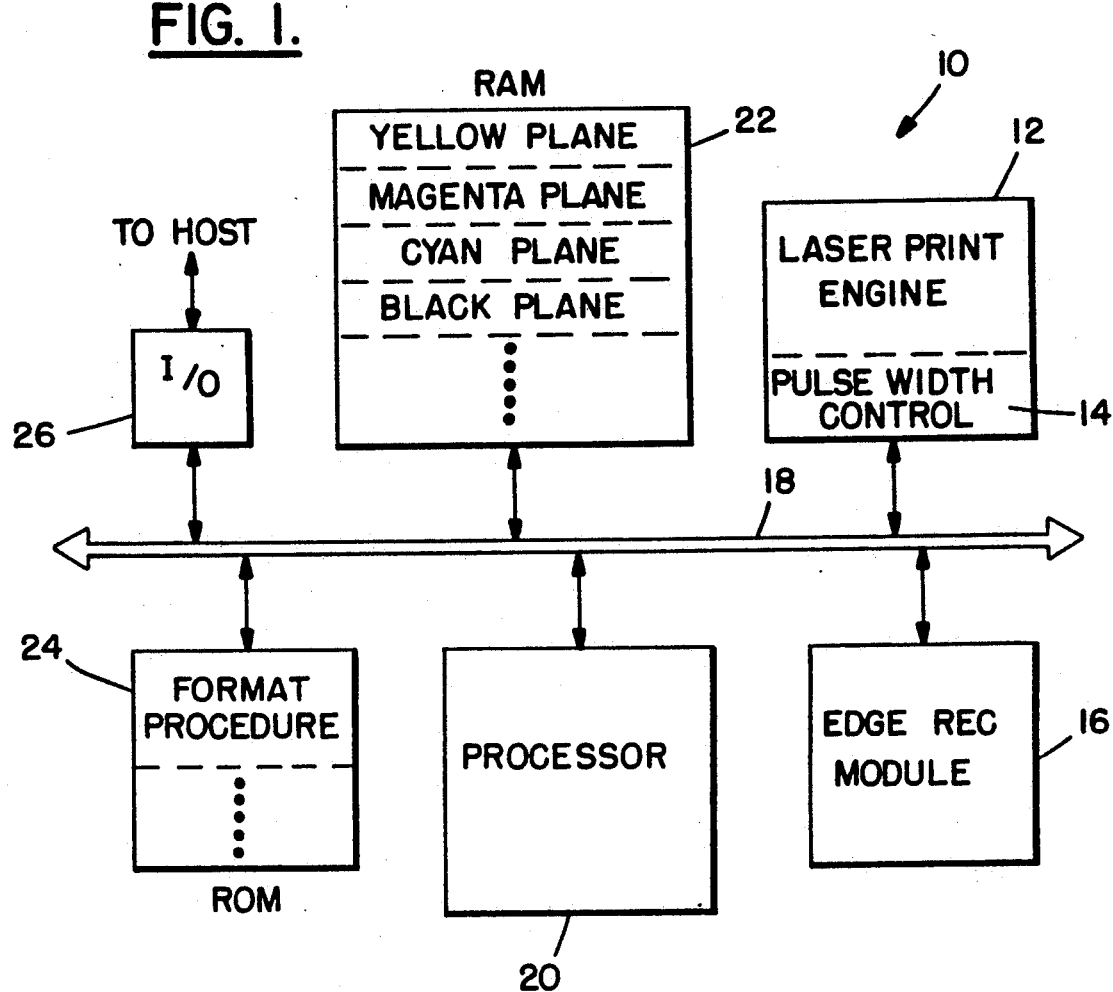
FIG. 1 is a high level block diagram of a multicolor electrostatic laser printer that embodies the invention.
Figure 2:
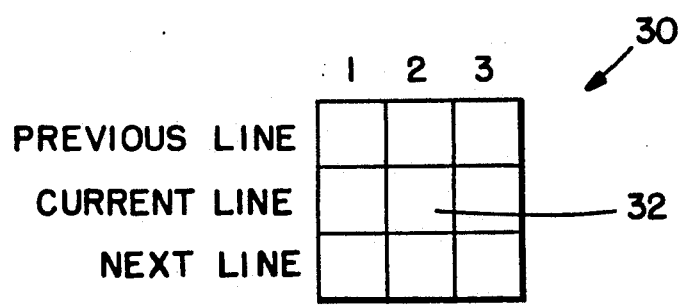
FIG. 2 illustrates a 3×3 window of pixels that is employed to identify an edge pixel.

Referring to FIG. 1, an electrostatic laser printer 10 comprises a laser print engine 12 that includes an electrostatic drum and one or more lasers that are employed to selectively discharge an electrostatic surface of the drum (not shown). A pulse width control module 14 is operable to alter the exposure time of the laser(s) within laser print engine 12 upon receipt of an appropriate command from edge recognition module 16. The details of edge recognition module 16 will be described with respect to FIGS. 2 and 3.

A bus 18 provides communication between the major subsystems of printer 10 and connects to laser print engine 12, edge recognition module 16, a processor 20, a random access memory (RAM) 22 and a read only memory (ROM) 24. An I/O module 26 receives color image data from a host processor and places it on bus 18 for storage in RAM 22.

As printer 10 is adapted to produce color-printed sheets, data from the host processor is subjected to formatting procedures that are stored in ROM 24. Those format procedures convert the input data stream into raster arranged pixel images. Separate pixel images are created for yellow, magenta and cyan colors, with each pixel color image being stored in a memory plane within RAM 22. A black pixel image raster plane may also be provided or, black images may be determined by combined yellow, magenta and cyan pixels. In general, a more pleasing print quality occurs when a black toner is used rather than depending upon a "process" black that is achieved by the combination of yellow, magenta and cyan toners.

During a print action, each primary color plane is read out to laser print engine 12 and controls the laser's exposure of corresponding pixel areas on the drum's surface. The drum is then toned with a corresponding color toner. As successive primary color raster bit planes are read out to print engine 12, wherever a pixel is to represent a secondary color, either magenta or cyan is overprinted on a yellow underprint, or cyan is overprinted on a magenta underprint, to create the secondary color. After the black raster image has been passed to laser print engine 12, the combined toners on the drum are transferred to a sheet, fixed and the sheet is passed to the user.

Edge recognition module 16 is continually employed during the process of transfer of images from the various color pixel planes within RAM 22 to laser print engine 12. Edge recognition module 16 employs a pattern matching algorithm that utilizes a 3×3 window shown in FIG. 2 to determine if a center pixel is an edge pixel. Window 30 includes vertically aligned pixels from a previous raster scan line, a current raster scan line, and a next raster scan line. The center pixel under consideration is pixel 32 located at the center of window 30. Edge recognition module constructs window 30 and determines from color states of pixels within window 30 whether pixel 32 is at an edge of a color area.

Figure 3:
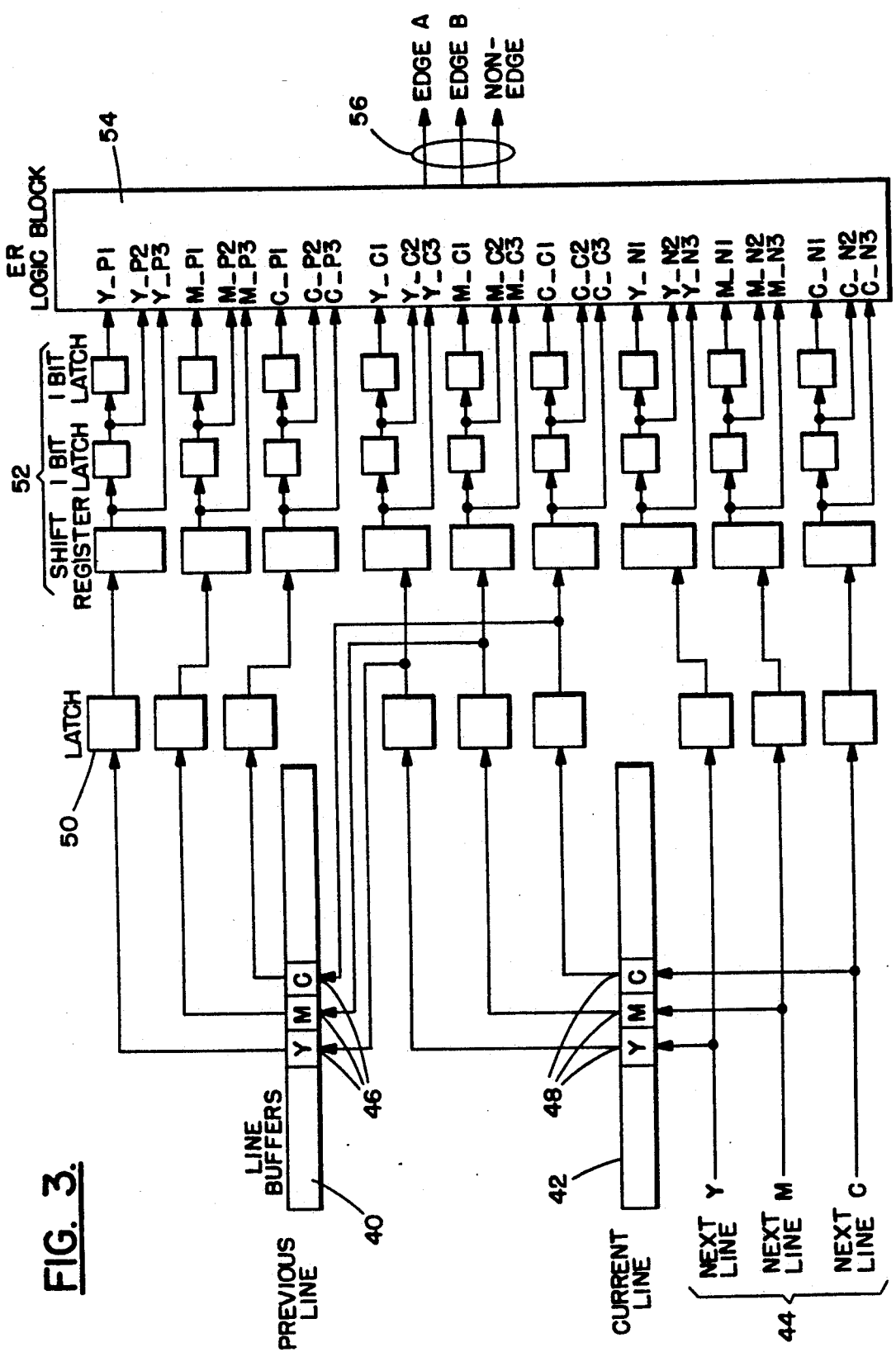
FIG. 3 is a detailed block diagram of circuitry within an edge recognition module shown in FIG. 1.

Circuitry for constructing window 30 is shown in FIG. 3 and comprises a previous line buffer 40, a current line buffer 42 and next line inputs 44. Each line buffer has three bit positions for each pixel position, i.e., yellow, magenta and cyan bits from the yellow, magenta and cyan planes in RAM 22. Bit positions 46 represent the yellow, magenta, and cyan pixel values for pixel 1 from a previous line. That pixel is denoted P1. Similarly, buffer positions 48 in current line buffer 42 contain yellow, magenta and cyan values for a pixel C1 from a current line. Pixel inputs on lines 44 are the yellow, magenta and cyan color values for pixel N1 in the next line. Each of those pixel values is simultaneously read out into a latch 50 where it is staged for transfer into a shift register arrangement 52.

Upon command, the yellow, magenta and cyan values for the pixels P1, Cl and N1 are simultaneously transferred into associated shift registers 52 where they are then clocked into edge recognition logic block. Over three shifts, the yellow, magenta and cyan values for the nine pixels within pixel window 30 are shifted into edge recognition logic block 54. Therein is determined whether pixel 32 is an "Edge A", an "Edge B" or a "non-edge" pixel.

An Edge A pixel is any non-white or non-black pixel with at least one neighboring pixel of a different color. A neighboring pixel is one of four pixels to the left, right, above, or below center pixel 32. While corner pixels may be considered, they are not in the preferred mode. Edge A classification is used to signify that the current pixel forms an edge of an area and should be modulated differently than non-edge pixels.

Edge B pixels are a subset of Edge A pixels in which center pixel 32 is an edge pixel having a secondary color (e.g. red, green, or blue), that borders a primary color pixel whose color is the same as the overprint color of center pixel 32. For instance, an Edge B pixel may be a red pixel with at least one magenta neighbor, or a green or blue pixel with at least one cyan neighbor. The Edge B classification is employed to signify a case when the overprinted toner of an edge pixel should not be reduced.

Non-edge pixels may be grouped into various types; black or white pixels, non-edge pixels in solid fill areas, isolated pixels, single pixel wide lines, or single pixel points at which no correction is desired.

All of the above pixel arrangements are determined by edge recognition logic block 54 that includes logic that responds to pixels arrangements within a pixel window 30 to provide a classification of center pixel 32. Thus, one of outputs 56 will always be energized in response to the pixel states in a pixel window 30.

Turning now to FIGS. 4-9, specific examples will be provided of Edge A, Edge B, non-edge pixels and resultant laser modulations that occur. Table 1 below illustrates the pulse width modulations applied to laser print engine 12 by pulse width control 14 in response to one of inputs 56 from edge recognition logic block 54.

TABLE 1

| Dot Type | Y, M, or C Primary Color | Underprinted Color in Secondary Color | Overprinted Color in Secondary Color |
|---|---|---|---|
| Non-Edge | 100% | 30-40% | 60% |
| Edge A | 60% | 60% | 70% |
| Edge B | NA | 60% | 100% |

The percentage entries in Table 1 indicate whether the laser beam that is directed onto a particular pixel is to be at full power (i.e. 100%), or at some percentage of full power. That percentage of power may vary between 30% and 70%, however, it is to be realized by those skilled in the art that those percentages may be varied in accordance with specific circumstances.

Turning now to FIGS. 4-6, edge recognition and correction as implemented by the Konica Corporation will be further described. In FIG. 4, a secondary color pixel 60 in a solid fill area is shown that comprises an overprinted toner 62 and an underprinted toner 64, on drum surface 66. Each of underprinted and overprinted toners 62 and 64 is a primary color. Since pixel 60 is a non-edge pixel, Table 1 indicates that the laser beam should be modulated so that its duration is 30-40% of maximum during deposition of underprinted toner 62; and that the laser beam should be modulated to 60% of maximum when deposition of overprinted toner 62 occurs. In such a manner, a proper color mix is achieved in the fill area.

In FIG. 5, an Edge A pixel 70 is illustrated that reflects a secondary color comprising overprinted toner 72 and underprinted toner 74. Examples of Edge A pixel arrangements are shown in FIG. 6. In each of the windows shown in FIG. 6, W represents white, K is black, Y is yellow, M is magenta, C is cyan, R is red, G is green, B is blue and a blank space is a "don't care". As above indicated, an Edge A classification is used to signify that a center pixel forms an edge of an area and should be modulated differently than non-edge pixels of a solid fill area. Note that in each case shown in FIG. 6, the center pixel is bounded by a neighboring pixel of a different color.

As shown on the Edge A line in Table 1, if the center pixel is a primary color, then the laser beam should be modulated to a 60% level to reduce the pixel's size somewhat so as to prevent an overlap with an adjoining pixel of a different color. If, by contrast, the center pixel is a secondary color, the underprinted color should be printed using a laser modulation of 60%. The overprinted color should be applied using a laser modulation of 70%. The additional laser beam exposure of the underprinted color causes an increase in underprinted toner. The increase is underprinted toner attenuates the laser beam exposure of the overprinted color to prevent the aforementioned halo effect. The slight additional laser beam exposure of the overprinted color overcomes some of the attenuation created by the underprinted toner and enables good registration of the overprinted and underprinted toners.

Turning now to FIG. 7, an example is shown of an Edge B configuration of adjacent pixels. In this case, a secondary color pixel 80 comprises overprinted toner 82 and underprinted toner 84. Adjacent pixel 86 is a primary color pixel and includes only overprinted toner 88. In this case, overprinted toners 82 and 88 are the same primary color. If the modulation scheme shown with respect to FIG. 5 was applied to the arrangement shown in FIG. 7, it is possible that overprinted toner 82 would not overlap underprinted toner 84 but would be attracted to the same color toner 88 used for pixel 86. Therefore, when an Edge B case, such as shown in FIG. 7, is detected in edge recognition logic block 54, an edge B indication is provided and overprinted toner 82 is applied using the full power of the laser beam. Thus, overprinted toner is caused to overlap underprinted toner 84 and the result is a smooth boundary between toners 82 and 88.

In FIG. 8, other examples of Edge B pixels are shown. As above indicated, an Edge B pixel is a red pixel with at least one magenta neighbor, or a green or blue pixel with at least one cyan neighbor. More specifically, Edge B is used to signify the case where the overprinted toner of an edge pixel is the same color as an adjacent primary color pixel and that the overprinted toner laser pulse should not be reduced.

In FIG. 9, certain pixel representations are shown which would otherwise be indicated as edge cases, but are inhibited from being so indicated. If as shown in window 90, center pixel 91 is a primary color (yellow, magenta, or cyan) and it is either an isolated dot or a single pixel-wide line (such as shown in window 94 by pixels 91, 92, 93) or a single pixel point 95 that is surrounded by pixels 96 not containing the center pixel's primary color (as shown in window 97), an edge indication is inhibited. In each of windows 90, 94 and 97, if the laser modulation for the primary color center pixel was reduced, it is likely that the pixel would not be toned or would be toned insufficiently to produce an acceptable representation. Thus, in each of the cases shown in FIG. 9, while, logically the pixel arrangement satisfies the conditions classification as an edge pixel, such a classification is inhibited and such pixel arrangements are indicated as non-edge pixels.

The following is pseudo-code listing of the logic for edge recognition logic block 54 to accomplish the above edge and non-edge classifications of center pixels.

```
function fNon-Edge
    if ( P2 = C1 = C2 = C3 = N2) then
        return true
    else
        return false
    end if
end
function fEdge_A_Exception
    if (( All Surrounding Dots do not contain center dot's
    primary color, Y, M, or C) or (Six or more Surrounding Dots
    do not contain dot's of primary color and Five or more of
    these are not white)) then
        return true
    else
        return false
    end if
end
function fEdge_B
    if ( Center Dot = Red) then
        if (( P2 = Magenta) or ( C1 = Magenta)
        or ( C3 = Magenta) or (N2 =Magenta)) then
            return true
        else
            return false
        end if
    else/*Center Dot = Green or Blue */
        if((P2 = Cyan) or (C1 = Cyan)
```

```
                or (C3 = Cyan) or (N2 = Cyan)) then
                    return true
                else
                    return false
                end if
end
Main
            case Center Dot (C2)
                White or Black)
                    Non-Edge
                Yellow, Magenta, or Cyan)
                    if (fNon-Edge or fEdge_A_Exception) then
                        Non-Edge
                    else
                        Edge A
                    end if
                Red, Green or Blue)
                    if fNon-Edge then
                        Non-Edge
                    else if fEdge_B then
                        Edge B
                    else
                        Edge A
                    end if
            end case
end
```

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enhancing color representations at boundaries between pixels of different colors in a multi-color electrostatic layer printing system, said system employing a charged electrostatic surface that is selectively discharged by application of a modulated laser beam, said method comprising the steps of:
   identifying a secondary color pixel that bounds a pixel of another color;
   decreasing applied laser power to said electrostatic surface at said secondary color pixel in a process of applying a primary color underprint toner and a primary color overprint toner to said electrostatic surface to produce said secondary color; and
   inhibiting said decrease of applied laser power in the process of applying said overprint toner when said pixel of said another color is a primary color and is identical in color to said overprint toner.

2. The method as recited in claim 1 wherein, as a result of said inhibiting step, a higher laser power is applied to said pixel of said first color prior to overprint toning, whereby an overprint toner deposit results that is larger than said underprint toner, said pixels thereby exhibiting a smooth color boundary therebetween.

3. The method as recited in claim 2 wherein said identifying step examines a window comprising a plurality of adjacent pixels to determine whether said pixel of said secondary color bounds a pixel of said another color.

4. A method for enhancing color representations at boundaries between pixels of different colors in a multi-color electrostatic laser printing system, said system employing a charged electrostatic surface that is selectively discharged by application of a modulated laser beam, said method comprising the steps of:
   identifying as a boundary pixel a first pixel location of a first color that bounds a second pixel location of another color;
   decreasing applied laser power to said electrostatic surface at said first pixel location in a process of applying a primary color toner to said electrostatic surface; and
   preventing identification of said first pixel location as a boundary pixel so as to inhibit said decrease of applied laser power to said charged electrostatic surface when said first pixel consists of a primary color toner and is adjacent on all sides to pixels of a different color, said different color excluding said primary color.

5. The method as recited in claim 4 wherein the identification prevention step also occurs when said first pixel consists of a primary color toner and is part of a line of pixels that is one pixel wide.

6. The method as recited in claim 4 wherein said identification preventing step also occurs when said first pixel exhibits a primary color and is bounded by a plurality of second pixels exhibiting a secondary color, said secondary color including an overprint toner that is not said primary color.

* * * * *